United States Patent Office 3,285,929
Patented Nov. 15, 1966

3,285,929
FUNGICIDAL COMPOUNDS CONTAINING THE NSCFCl$_2$-GROUPS
Erich Klauke, Cologne-Flittard, Engelbert Kuhle and Ferdinand Grewe, Cologne-Stammheim, and Helmut Kaspers and Richard Wegler, Leverkusen, Germany, assignors to Farbenfabriken Bayer Aktiengesellschaft, Leverkusen, Germany, a corporation of Germany
No Drawing. Filed Oct. 31, 1961, Ser. No. 148,845
Claims priority, application Germany, Nov. 3, 1960, F 32,468; Nov. 25, 1960, F 32,620
8 Claims. (Cl. 260—301)

The present invention relates to new and useful improvements in fungicidal preparations and more particularly to improved fungicides. This invention also relates to methods of protecting organic material subject to attack by low orders of organisms. This invention further relates to the synthesis of new chemical compounds, namely N-thiomonofluoro-dichloromethyl imides of the following general formula

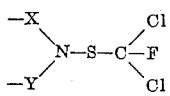

in which X stands for organic acyl radicals and Y stands for another acyl radical or another suitable organic radical; X and Y may be linked together, too, to form a common ring system.

Similar compounds of the aforementioned type which contain instead of an =NSCFCl$_2$-group the =NSCCl$_3$-group are known already from the literature. U.S. Patents 2,553,770; 2,553,771; 2,553,772; 2,553,773; 2,553,774; 2,553,775; 2,553,776; 2,844,628, for instance, describe a large number of such compounds containing a trichloro-methylmercapto group.

In accordance with the present invention it has now been found that a large number of organic compounds containing the =NSCFCl$_2$-group are extremely effective for controlling the growth of fungi, and in this respect are superior to those compounds of the prior art containing the =NSCCl$_3$-group.

The physiologically active compounds of this invention may thus best be represented as having the =—NSCFCl$_2$-group in which the nitrogen is linked to two carbon atoms, two acyl groups, or one acyl group and one carbon atom. The phase acyl group refers especially to groups of the following character

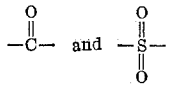

etc. (see Hackh, "Chemical Dictionary," second edition, page 21). When the nitrogen atom of the =—NSCFCl$_2$-group is linked to one acyl group, the compounds may be regarded as amide derivatives. When both of the free linkages of the =NSCFCl$_2$-group are taken up by acyl groups, the compounds may be regarded as imides (see Sidgwick's "Organic Chemistry of Nitrogen" 1937 edition, pages 136 and 152).

Suitable amide compounds of the indicated type are thus illustrated in Formula I:

(I) 

in which R represents an organic residue, possibly linked to X via nitrogen, oxygen or sulfur, too, X is part of an acyl group, such as for example

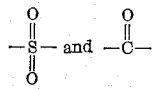

and R′ represents an organic radical or a hydrogen radical.

Suitable imide compounds of the indicated type are illustrated by Formula II:

(II) 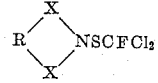

in which R represents one or more organic residues and X is part of an acyl group, such as for example

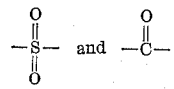

The organic residue may be aliphatic, aromatic, alicyclic, heterocyclic, and their substituted derivatives, and may be attached furthermore to the above said group also by heteroatoms such as nitrogen, sulfur or oxygen.

The novel compounds of this invention may be prepared in general by the reaction of dichloro-monofluoromethyl-sulf-enylchloride (ClSCFCl$_2$), with the corresponding imide or the metal salt of this compound. Formula III generally illustrates this reaction where M represents hydrogen or a metal, and where both of the acyl groups are derived from carboxylic acid groups:

(III) 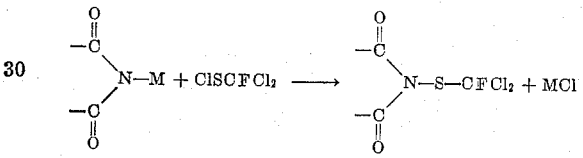

This reaction is shown only to illustrate this invention and not intended to limit it in any way. Other inventive compounds as it may be seen from the examples can be prepared by exactly the same method.

The reaction to prepare the inventive compounds may be carried out at room temperature or at slightly elevated temperature either in an aqueous medium or also in inert organic solvents such as benzene, dioxane, carbon tetrachloride and the like. If the free imides are used, i.e. if M stands for hydrogen, the reaction is carried out with preferably in the presence of acid-binding agents, such as alkali metal hydroxides, -carbonates, -alcoholates, and the like, or also in the presence of tertiary organic amines.

Starting materials for the inventive reaction broadly may be seen from the patent specifications mentioned at the beginning. As some examples of the specifications there may be mentioned: phthalimide, tetrahydrophthalimide, 3.6-endomethylene-Δ$^4$-tetrahydrophthalimide, 3-nitrophthalimide, succinic imide, 2.4-dioxothiazolidine, parabanic acid, 1.4-dioxyphthalazine, benzene sulfonic acid methylamide, 4-chlorobenzene-sulfonic acid anilide, chloromethane sulfonic acid anilide or N,N,N′-trimethylsulfamide.

Another method suitable for the preparation of the inventive compounds consists in reacting the thio-trichloromethylamides known from the aforementioned specifications, with anhydrous hydrogen fluoride. Most surprisingly under even severe reaction conditions only one chlorine atom is split off and replaced by fluorine. The following reaction scheme may illustrate this method:

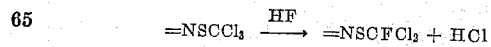

The two bonds before the nitrogen atom may preferably stand for the radical mentioned in the foregoing description.

Anhydrous hydrogen fluoride in the meaning of the above said statement should be a commercial product with a content of about 2% of water, but preferably not more.

The reaction usually is carried out under commercial pressure and at temperatures between 0 and 20° C.; preferably anhydrous hydrogen fluoride is used in an excess so that it serves at the same time as a diluent does. The excess easily can be removed then by distillation. Of course, also other inert solvents may be used as diluents. These inert solvents preferably are nitrobenzene, diethylether, dioxane and the like.

The new inventive compounds as stated above are valuable pesticides with especially fungicidal action and should be used in the field of plant protection. The main advantage of the inventive compounds over the trichloro compounds of the prior art is their better tolerableness on plants especially regarding phytotoxicity, without decrease in fungicidal activity. A further advantage over the prior art compounds is a longer lasting activity and better stability.

From the following experiment there is to be seen the high initial activity of the inventive compounds. The test is a green-house experiment and has been carried out with tomato plants (Bonny best). Aqueous emulsions of the compounds shown in the table below have been sprayed on the plants. The aqueous emulsions have been prepared by admixing the active ingredient with the same amount of dimethyl formamide and a commercial non-ionic emulsifier (NP10). Plants sprayed with these solutions are inoculated after 24 hours with Zoosporangia of *Phytophthora infestans*, and placed in humidity chambers Phytophthora infestans, and placed in humidity chambers at a temperature of 20° C. and a relative humidity of 100%. They are kept there for 5 days. After that the infestation has been checked and is shown in the table below in comparison to an untreated control test, infestation of which is set as 100.

| | Degree of infestation at a conc. of active ingredient in percent (aqueous emulsion) | |
|---|---|---|
| | 0.025 | 0.0062 |
| 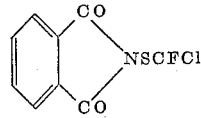 | 0 | 5 |
| 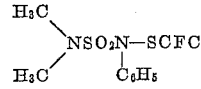 | 0 | 3 |
| 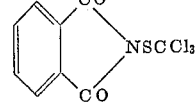 | 3 | 14 |
| 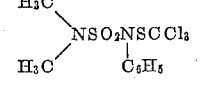 | 1 | 13 |
| Control | | 100 |

*Example 1*

18.5 grams of the potassium salt of phthalimide are dissolved in 100 ml. of toluene and treated with a solution of 17.0 grams of dichlorofluoromethane sulfenic acid chloride in 50 ml. of toluene at room temperature. Thereby the temperature rises to about 40° C. Heating is continued for about half an hour at 80° C., the reaction mixture then is filtered off the potassium chloride. The crystal obtained is filtered off with suction. After recrystallization from alcohol there are obtained 9 grams of N-dichlorofluoro-methyl-thiophthalimide of M.P. 152–152.5° C.

*Example 2*

20 grams of N.N.dimethyl-N'-phenylsulfamide and 17 grams of dichlorofluoro-methane sulfenic chloride are dissolved in 100 ml. of toluene and treated with 11 grams of triethylamine at room temperature. Thereby the temperature rises to about 40° C. After stirring for some time water is added, the toluene layer is dried over sodium sulfate and concentrated in vacuum. The crystalline residue melts after recrystallization from alcohol at 110–112° C. There are obtained 18 grams of the N.N-dimethyl - N' - phenyl - N' - dichlorofluoromethyl - thiosulfamide.

In analogous manner there may be obtained the compounds of the following formulae:

$(H_3C)_2N—SO_2N—SCFN_2$
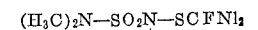
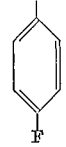
F

M.P. 81–82° C.

$(CH_3)_2N—SO_2—N—SCFCl_2$
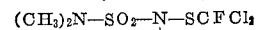
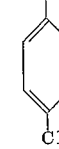
$CH_3$

M.P. 97° C.

$(H_3C)_2N—SO_2—N—SCFCl_2$
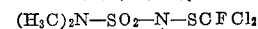—$CH_3$
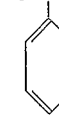

M.P. 60–61° C.

$(H_3C)_2N—SO_2—N—SCFCl_2$
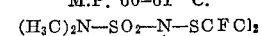—$Cl$
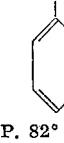

M.P. 82° C.

$(H_3C)_2N—SO_2—N—SCFCl_2$
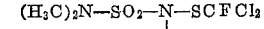
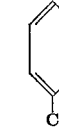
Cl

M.P. 116° C.

*Example 3*

38 grams of Δ⁴-tetrahydrophthalimide together with 10 grams of caustic soda are dissolved in 170 ml. of water and treated with 43 grams of dichlorofluoromethane-sulfenic acid chloride at a temperature of 13–15° C. The crystal mass obtained is after stirring for some time filtered off with suction and washed with water. The N-dichlorofluoromethyl-thio-tetrahydrophthalimide melts at 102–104° C.

In analogous manner there are obtained the compounds of the following formulae:

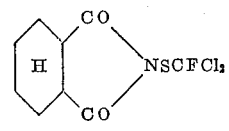

M.P. 46–48° C.

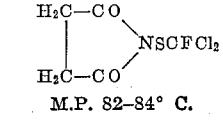

M.P. 82–84° C.

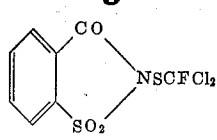

M.P. 126–128° C.

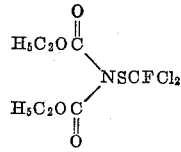

B.P. 141–143° C.

*Example 4*

46.6 grams of benzene sulfanilide together with 8 grams of caustic soda are dissolved in 250 ml. of water and are treated dropwise with 34 grams of dichlorofluoro-methane-sulfenic acid chloride at 15–20° C.; the separated crystals are filtered off with suction and the N-thio-dichlorofluoro-methyl-N-phenyl-benzene-sulfonic acid amide is crystallized from methanol; M.P. 116–120° C.

In an analogous manner there are obtained the compounds of the following formulae:

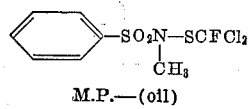

M.P.—(oil)

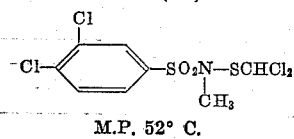

M.P. 52° C.

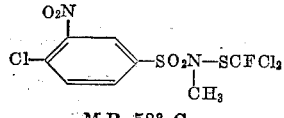

M.P. 58° C.

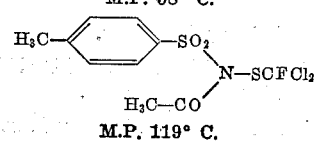

M.P. 119° C.

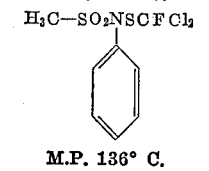

M.P. 136° C.

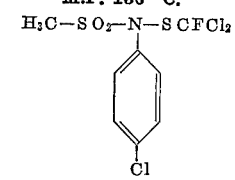

M.P. 119° C.

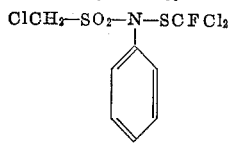

M.P. 95° C.

*Example 5*

Into a suspension of 5 grams of the potassium salt of phthalimide in 100 ml. of dioxane there are added dropwise 5 grams of fluorodichloro-methane-sulfenic bromide (B.P.$_{11}$ 24–27° C.), whereby the temperature of the mixture rises to about 30° C. After the addition of water there are obtained 5 grams of N-(dichloro-fluoro-methylthio-)phthalimide of M.P. 152° C.

*Example 6*

37 grams of furfurylidene-benzene-sulfonyl-hydrazone together with 6 grams of sodium hydroxide are dissolved in 200 ml. of water and this solution is treated with 26 grams of fluoro-dichloro-methane-sulfenic acid chloride at 15 to 20° C. Thereby crystallization of the mixture occurs. The reaction mixture is stirred for some time and the crystals are then filtered off with suction. M.P. 100–103° C. Yield: 45 grams.

In analogous manner there are obtained the compounds of the following formulae:

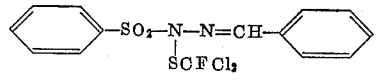

M.P. 87–91° C.

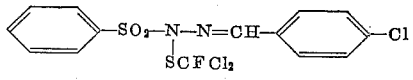

M.P. 121–123° C.

*Example 7*

A solution of 26.8 grams of the cyclic sodium salt of maleic acid hydrazide in 200 ml. of water is treated dropwise with 34 grams of fluoro-dichloro-methane sulfenic acid chloride, at a temperature of 10 to 12° C. Thereby a crystal mass is obtained, which after stirring the mixture for some time is filtered off with suction. There are obtained 37 grams of the corresponding sulfenic acid derivative of M.P. 205–210° C. (under decomposition).

*Example 8*

A mixture of 11.7 grams of thiazoline-1.3-dione-(2.4) and 4 grams of sodium hydroxide is dissolved in 100 ml. of water and this solution is treated with 17 grams of fluoro-dichloro-methane-sulfenic acid chloride at a temperature of 10 to 15° C. The separating crystal (21 grams) is filtered off with suction and dried; M.P. 49 to 52° C.

In analogous manner there are obtained the compounds of the following formulae:

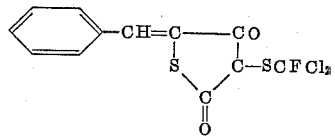

M.P. 135° C.

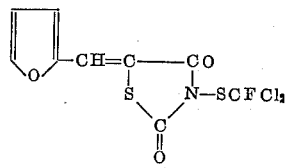

M.P. 127° C.

*Example 9*

Into a reaction container, of copper or of stainless steel and provided with a stirrer, a reflux condenser and a thermometer, there are placed 15 grams of N-trichloro-methyl-thiophthalimide. Under anhydrous conditions there are added to this solution about 100 grams of anhydrous hydrofluoric acid at a temperature of about 0° C. This mixture is now after stirred for 65 hours while the temperature rises slowly. During the reaction the reflux condenser is cooled with NaCl-ice water and protected against air-humidity with a CaCl$_2$-tube. The mixture afterwards is poured on 400 grams of ice and the separated residue is filtered off with suction. After washing thoroughly with water there are obtained 13.5 grams of N-dichloro-fluoro-methyl-thiophthalimide of M.P. 150–151° C. (from alcohol).

*Analysis.*—C₉H₄Cl₂FNO₂S, calculated: F, 6.78%. Found: F 6.60%.

We claim:

1. A fungicidal compound of the formula

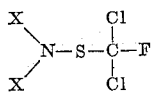

wherein X and Y individually are selected from the group consisting of an organic acyl radical, an aliphatic radical, an aromatic radical and a heterocyclic radical and when X and Y are taken together with the nitrogen atom, a heterocyclic radical, at least one member of X and Y being an organic acyl radical linked to the nitrogen atom through the acyl portion.

2. The compound of the formula

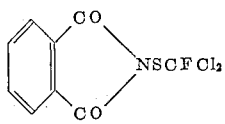

3. The compound of the formula

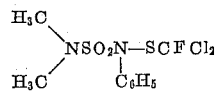

4. The compound of the formula

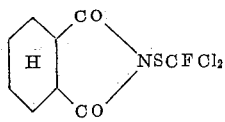

5. The compound of the formula

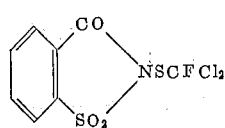

6. The compound of the formula

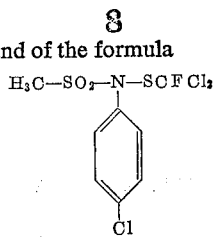

7. A compound of the formula

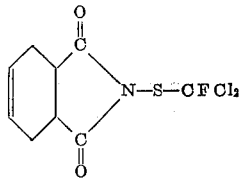

8. A compound of the formula

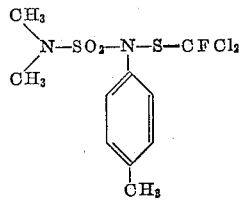

References Cited by the Examiner

UNITED STATES PATENTS

| | | | |
|---|---|---|---|
| 2,553,770 | 5/1951 | Kittleson | 260—326 |
| 2,553,771 | 5/1951 | Kittleson et al. | 260—326 |
| 2,875,030 | 2/1959 | Brugmann et al. | |
| 3,036,088 | 5/1962 | Harris | 260—326 |

OTHER REFERENCES

Bergmann: The Chemistry of Acetylene and Related Compounds, page 80 (1948).

Horsfall: Principles of Fungicidal action (Massachusetts), 1956), pages 73 and 205–206.

ALEX MAZEL, *Primary Examiner.*

IRVING MARCUS, WALTER A. MODANCE, NICHOLAS S. RIZZO, *Examiners.*

E. E. BERG, A. D. ROLLINS, *Assistant Examiners.*